US012326016B2

(12) United States Patent
Yong et al.

(10) Patent No.: US 12,326,016 B2
(45) Date of Patent: Jun. 10, 2025

(54) LOCK MECHANISM WITH ICE BREAKING MECHANISM

(71) Applicant: Inteva Products LLC, Troy, MI (US)

(72) Inventors: Hua Yong, Shanghai (CN); Xiao Yao, Shanghai (CN); Huang Xinran, Shanghai (CN); Wang Yangfei, Shanghai (CN)

(73) Assignee: INTEVA PRODUCTS, LLC, Troy, MI (US)

( * ) Notice: Subject to any disclaimer, the term of this patent is extended or adjusted under 35 U.S.C. 154(b) by 396 days.

(21) Appl. No.: 17/986,701

(22) Filed: Nov. 14, 2022

(65) Prior Publication Data

US 2024/0110410 A1 Apr. 4, 2024

Related U.S. Application Data

(60) Provisional application No. 63/413,074, filed on Oct. 4, 2022.

(51) Int. Cl.

| | |
|---|---|
| ***E05B 77/00*** | (2014.01) |
| ***E05B 79/20*** | (2014.01) |
| ***E05B 83/36*** | (2014.01) |
| ***E05B 85/24*** | (2014.01) |
| ***E05B 85/26*** | (2014.01) |

(52) U.S. Cl.
CPC .............. *E05B 77/00* (2013.01); *E05B 79/20* (2013.01); *E05B 83/36* (2013.01); *E05B 85/243* (2013.01); *E05B 85/26* (2013.01)

(58) Field of Classification Search
CPC .......... E05B 77/00; E05B 79/20; E05B 83/36; E05B 85/26; E05B 85/243; E05B 81/16
USPC ........................................................ 292/200
See application file for complete search history.

(56) References Cited

U.S. PATENT DOCUMENTS

| | | | | |
|---|---|---|---|---|
| 9,995,066 | B1 | 6/2018 | Ottolini et al. | |
| 2019/0292817 | A1* | 9/2019 | Tomaszewski | E05B 79/20 |
| 2020/0080348 | A1* | 3/2020 | Cappelli | E05B 81/20 |
| 2020/0131836 | A1* | 4/2020 | Ottino | E05F 1/105 |
| 2023/0027125 | A1* | 1/2023 | Cervone | E05B 81/13 |
| 2023/0034544 | A1* | 2/2023 | Mozola | E05B 81/20 |

(Continued)

FOREIGN PATENT DOCUMENTS

| | | | | |
|---|---|---|---|---|
| CN | 104179405 | A | 12/2014 | |
| CN | 108301727 | A | 7/2018 | |
| CN | 111663868 | A * | 9/2020 | E05B 79/12 |

(Continued)

*Primary Examiner* — Kristina R Fulton
*Assistant Examiner* — James Edward Ignaczewski
(74) *Attorney, Agent, or Firm* — CANTOR COLBURN LLP

(57) ABSTRACT

A lock mechanism with an ice breaking mechanism. The lock mechanism is composed of a lock ring, an engagement plate, a pawl, a shaft, an engagement plate driving rod, a pawl release lever, a release lever, a support, a swinging claw, a tensioning wheel, a cable, a pulley, a limiting member, a supporting arm, a fixed shaft, a pull rod, a spring, a swinging ice breaking arm, an ice breaking pull rod, and the like. The lock mechanism is provided with the ice breaking mechanism. The ice breaking mechanism may be started to push a vehicle door away by a specific distance, so as to assist in manually or automatically opening the door, which improves the degree of satisfaction of customers.

14 Claims, 9 Drawing Sheets

(56) References Cited

U.S. PATENT DOCUMENTS

| | | | | |
|---|---|---|---|---|
| 2024/0418014 | A1* | 12/2024 | Sanchez Rojas ....... | E05B 81/22 |
| 2024/0426145 | A1* | 12/2024 | Yu ........................... | E05B 79/20 |

FOREIGN PATENT DOCUMENTS

| | | | | | |
|---|---|---|---|---|---|
| CN | 112943010 | A | * | 6/2021 | ............. E05B 77/34 |
| CN | 214786723 | U | | 11/2021 | |
| CN | 115596298 | A | * | 1/2023 | |
| CN | 116427796 | A | * | 7/2023 | |
| CN | 219794974 | U | * | 10/2023 | |
| CN | 118208103 | A | * | 6/2024 | |

* cited by examiner

LOCK MECHANISM WITH ICE BREAKING MECHANISM

CROSS REFERENCE TO RELATED APPLICATIONS

This application claims the benefit of U.S. Provisional Patent Application No. 63/413,074 filed on Oct. 4, 2022, the contents of which are incorporated herein by reference thereto.

TECHNICAL FIELD

The present disclosure relates to the technical field of vehicle door locks, and in particular, to a lock mechanism with an ice breaking mechanism.

BACKGROUND

When a vehicle door is covered by rain and snow or residual water freezes on the vehicle door, the vehicle door may be frozen, and therefore cannot be popped open by a sealing strip. In this case, opening the door requires a large force, or even it is difficult to open the vehicle door. In such a working condition, the ice breaking mechanism can start a device to drive an engagement plate of a door lock to rotate, so as to open the vehicle door by virtue of a lock fastener.

During unlocking of a traditional door lock (for example, CN104179405A) to open a door, a ratchet and pawl mechanism inside a lock body is unlocked, and the door is popped open by compression potential energy of a sealing strip of the vehicle door. When a vehicle door is covered by rain and snow or residual water freezes on the vehicle door, the vehicle door cannot be popped open by a sealing strip. In this case, pulling or pushing the vehicle door requires a very large force, or even it is difficult to open the vehicle door.

In addition, with the intelligentization and electrification of vehicles and the development of shared vehicles, increasing types of vehicles are equipped with an electric door lock. As a result, hidden handles may be used, or even mechanical external handles may be canceled. In the above harsh rainy and snowy environment with a low temperature, if the vehicle door is frozen, the hidden handle possibly cannot be popped out, which means that no external handle is available. Thus, passengers cannot open the door. A solution to the problem is to mount a door actuator to push the door by a certain distance (refer to CN108301727A), which, however, increases the system complexity and costs.

SUMMARY

The present disclosure is intended to provide a lock mechanism with an ice breaking mechanism.

In order to realize the above purpose, the present disclosure provides a lock mechanism with an ice breaking mechanism, including a lock ring and a lock body.

The lock body includes a support, a shaft I is arranged on the support, an engagement plate and an engagement plate driving rod are mounted to the shaft I, the engagement plate driving rod is configured to drive the engagement plate to rotate together about the shaft I, and a groove configured to mate with the lock ring is arranged on the engagement plate.

A shaft VII is arranged on the support, a swinging ice breaking arm rotatable about the shaft VII is mounted to the shaft VII, a shaft VIII is fixed to the swinging ice breaking arm, an ice breaking pull rod is mounted to the shaft VIII, the ice breaking pull rod is rotatable about the shaft VIII relative to the swinging ice breaking arm, and an end of the ice breaking pull rod is configured to hook the engagement plate driving rod.

A shaft IV is arranged on the support, a tensioning wheel rotatable about the shaft IV is mounted to the shaft IV, and the tensioning wheel mates with the swinging ice breaking arm.

A shaft II is arranged on the support, a pawl and a pawl release lever rotatable about the shaft II are mounted to the shaft II, and the pawl is fixedly connected to the pawl release lever.

Preferably, the tensioning wheel is connected to a cable, and the cable is driven by an external actuator.

Preferably, the lock ring has a cylindrical portion, and the groove of the engagement plate mates with the cylindrical portion of the lock ring.

Preferably, a spring II is arranged on the shaft VIII, two legs of the spring II are respectively connected to the swinging ice breaking arm and the ice breaking pull rod, and a tensioning torque of the spring II drives the ice breaking pull rod to tend to rotate away from the shaft VII relative to the swinging ice breaking arm.

A reset spring is further arranged on the support, one spring leg of the reset spring is mounted to the shaft VIII, and another spring leg of the reset spring is mounted to the support or a housing.

Preferably, an end of the ice breaking pull rod is provided with a hook, the engagement plate driving rod is provided with a protrusion, and the hook of the ice breaking pull rod hooks the protrusion of the engagement plate driving rod.

Preferably, an included angle between a direction of a contact force between the hook of the ice breaking pull rod and the protrusion of the engagement plate driving rod and a direction of motion of the ice breaking pull rod is not less than 3 degrees.

Preferably, a shaft III is fixed to the tensioning wheel, a swinging claw rotatable about the shaft III is mounted to the shaft III, a shaft V is fixed to the swinging claw, a pulley freely rotatable about the shaft V is mounted to the shaft V, a shaft VI is mounted to the support or a housing, a rotatable limiting member is mounted to the shaft VI, a limiting groove is arranged on the limiting member, and a motion of the pulley is limited in the limiting groove.

Preferably, a protruding portion that mates with the swinging claw is arranged on the engagement plate.

Preferably, the lock mechanism includes a fixed shaft, a rotatable supporting arm is mounted to the fixed shaft, and a spring I is mounted between the supporting arm and the limiting member.

Preferably, the limiting member stops the supporting arm.

Preferably, a release lever is axially connected to the support, and a pull rod is connected between the release lever and the supporting arm.

Preferably, an inclined surface is arranged on the pull rod, a bulge is arranged on the ice breaking pull rod, and the inclined surface of the pull rod mates with the bulge of the ice breaking pull rod.

Beneficial effects of the present disclosure are as follows:

The lock mechanism of the present disclosure is provided with the ice breaking mechanism, which can drive the engagement plate of the door clock to rotate when the vehicle door is frozen, to pop open the vehicle door by virtue of a lock fastener, so as to assist in manually or automatically opening the door, thereby improving the degree of satisfaction of customers. In some preferred implementations, some components of the ice breaking mechanism can further realize a self-suck function, which improves the integration and reduces the costs.

BRIEF DESCRIPTION OF THE DRAWINGS

The accompanying drawings described herein are used to provide a further understanding of the present disclosure, and form a part of the present disclosure. Exemplary embodiments of the present disclosure and descriptions thereof are used to explain the present disclosure, and do not constitute any inappropriate limitation to the present disclosure. In the accompanying drawings.

Figure 1:
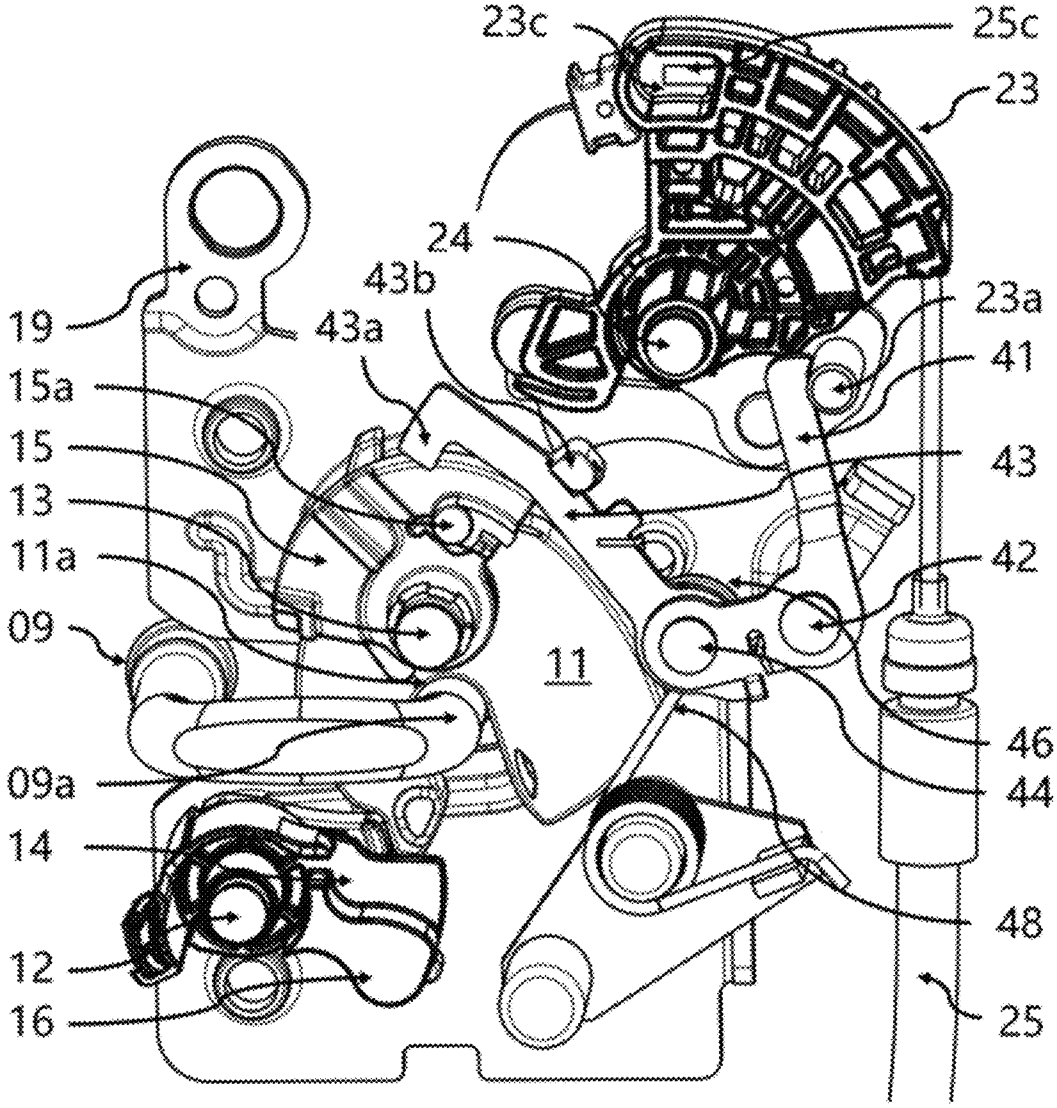
FIG. 1 is a schematic diagram of a lock mechanism with an ice breaking mechanism according to an embodiment of the present disclosure.
Figure 2:
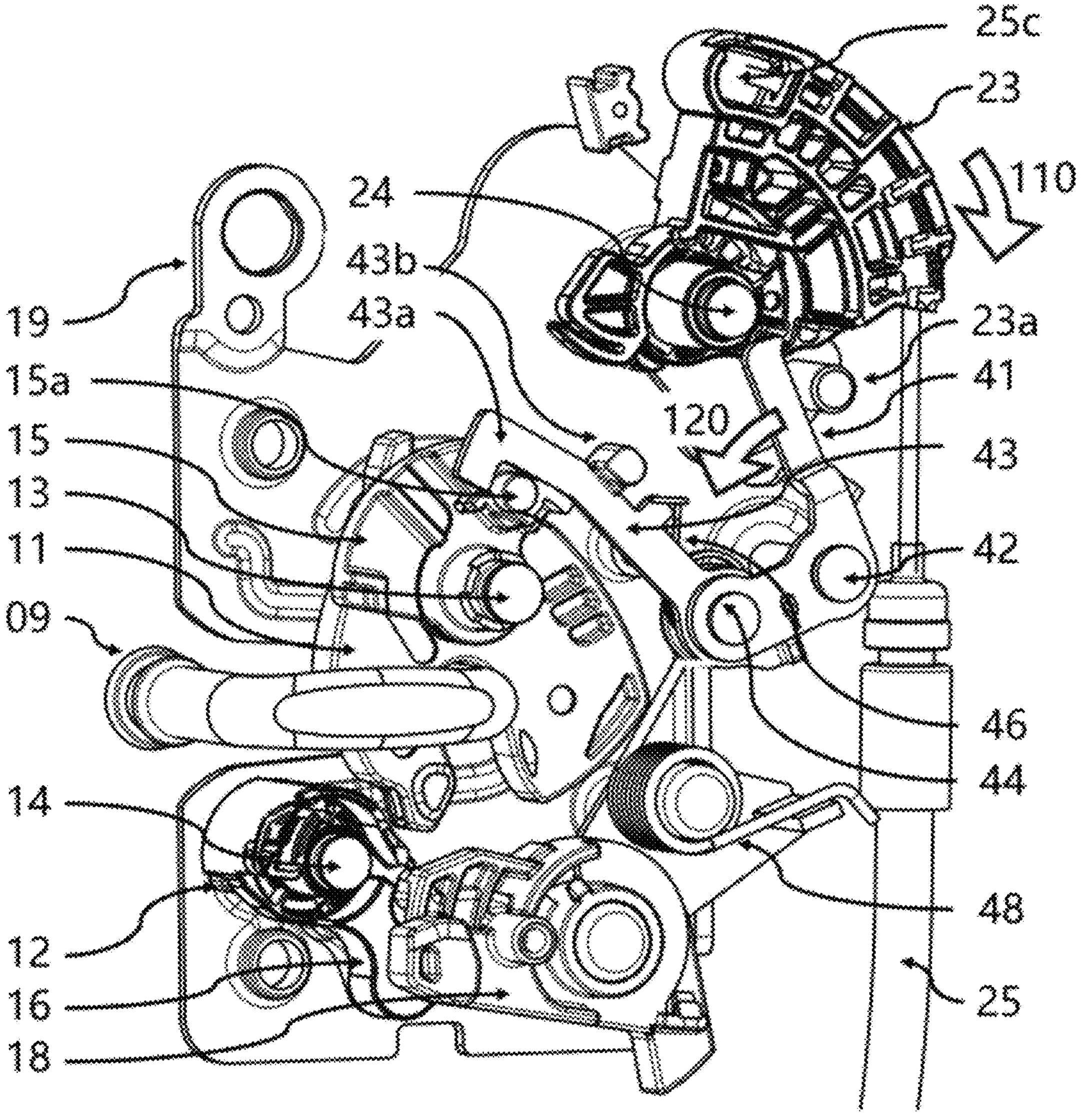
FIG. 2 is a schematic diagram of a lock mechanism with an ice breaking mechanism according to an embodiment of the present disclosure.
Figure 3:
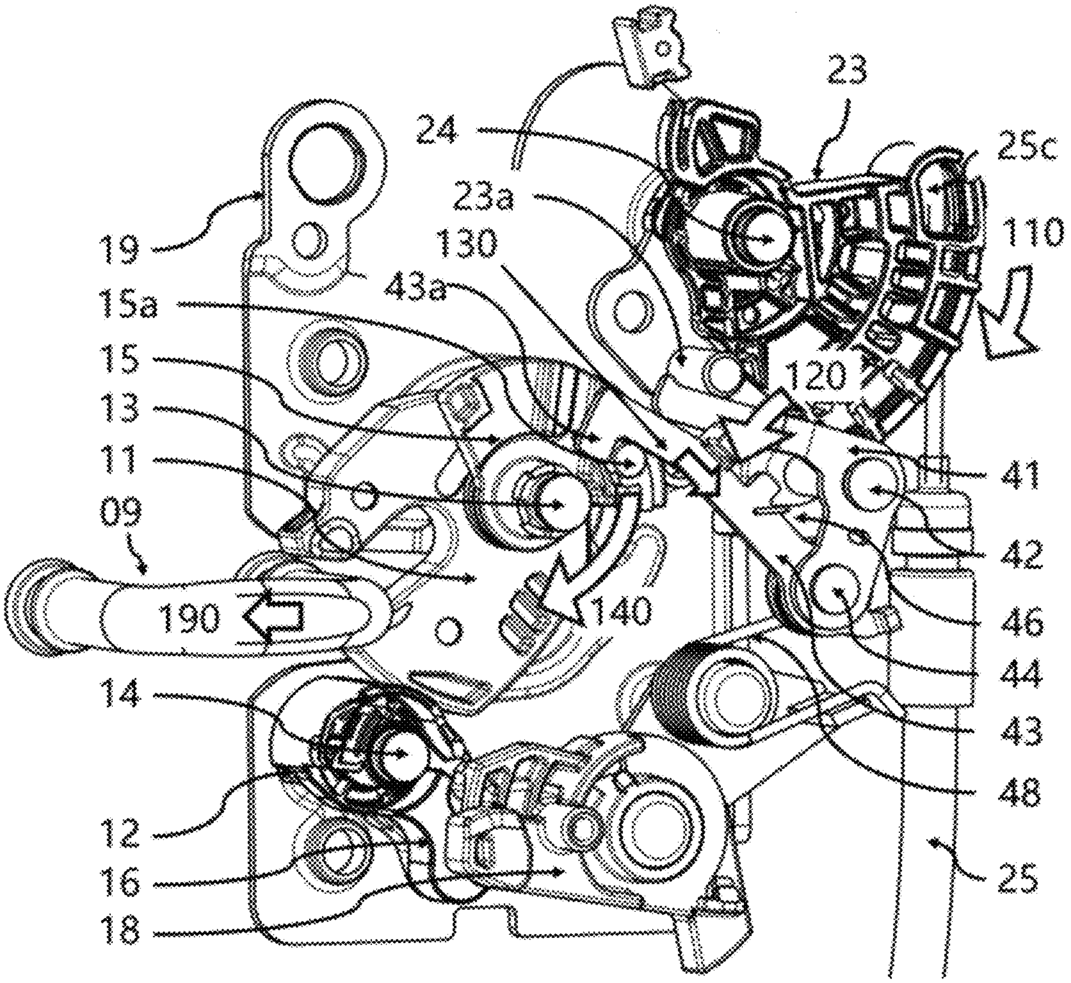
FIG. 3 is a schematic diagram of a lock mechanism with an ice breaking mechanism according to an embodiment of the present disclosure.

Descriptions of reference numerals are as follows:

09. Lock ring, 09*a*. Cylindrical portion, 11. Engagement plate, 11*a*. Groove, 11*c*. Protruding portion, 12. Pawl, 13. Shaft I, 14. Shaft II, 15. Engagement plate driving rod, 15*a*. Protrusion, 16. Pawl release lever, 18. Release lever, 18*c*. Connection portion, 19. Support, 21. Swinging claw, 22. Shaft III, 23. Tensioning wheel, 23*a*. Protrusion, 23*c*. Recess, 24. Shaft IV, 25. Cable, 25*c*. End portion, 31. Pulley, 32. Shaft V, 33. Limiting member, 33*a*. Limiting groove, 33*b*. Stop, 33*c*. Spring mounting portion, 34. Shaft VI, 35. Supporting arm, 35*b*. Stop, 35*d*. Spring mounting portion, 36. Fixed shaft, 37. Pull rod, 37*a*. End portion I, 37*b*. Inclined surface, 37*c*. End portion II, 39. Spring I, 39*c*. End portion I, 39*d*. End portion II, 41. Swinging ice breaking arm, 42. Shaft VII, 43. Ice breaking pull rod, 43*a*. Hook, 43*b*. Bulge, 44. Shaft VIII, 46. Spring II, 48. Reset spring.

110, 120, 130, 140, 150, 160, 170, 180, 190: Direction of motion.

135. Tilt angle, F131. Contact force, F132. Component I, F133. Component II.

DETAILED DESCRIPTION

The technical solutions proposed by the present disclosure are described in detail below with reference to the accompanying drawings and the specific embodiments. The advantages and features of the present disclosure are described more clearly according to the following description. It is to be noted that the accompanying drawings are all in a very simplified form and are not drawn to accurate scale, but are merely used for conveniently and clearly assisting in explaining the objective of the embodiments of the present disclosure.

An embodiment of the present disclosure provides a lock mechanism with an ice breaking mechanism, including a lock ring 09 and a lock body. The lock ring 09 has a cylindrical portion 09*a*, and the lock body includes a support 19.

A shaft I 13 is arranged on the support 19, and an engagement plate 11 and an engagement plate driving rod 15 rotatable about the shaft I 13 are mounted to the shaft I. The engagement plate driving rod 15 can drive the engagement plate 11 to rotate together when rotating about the shaft I 13. A groove 11*a* is arranged on the engagement plate 11, and the groove 11*a* mates with a cylindrical portion 09*a* of the lock ring 09. The engagement plate 11 pushes the cylindrical portion 09*a* when rotating along a direction 140, thereby driving the lock ring 09 to move away from the lock body along a direction 190.

A shaft II 14 is arranged on the support 19, a pawl 12 and a pawl release lever 16 rotatable about the shaft II 14 are mounted to the shaft II, and the pawl 12 is fixedly connected to the pawl release lever 16. A pawl-ratchet fit is formed between the pawl 12 and the engagement plate 11. When the pawl 12 is in an unlocked position, the engagement plate 11 can rotate freely and the lock mechanism is in an unlocked state.

A shaft VII 42 is arranged on the support 19, a swinging ice breaking arm 41 rotatable about the shaft VII 42 is mounted to the shaft VII, a shaft VIII 44 is fixed to the swinging ice breaking arm 41, an ice breaking pull rod 43 is mounted to the shaft VIII 44, the ice breaking pull rod 43 is rotatable about the shaft VIII 44 relative to the swinging ice breaking arm 41.

A shaft IV 24 is arranged on the support 19, a tensioning wheel 23 rotatable about the shaft IV 24 is mounted to the shaft IV, and a cable 25 is mounted to a recess 23*c* of the tensioning wheel 23 through an end portion 25*c* at one end of the cable. The cable 25 may be driven by an external actuator, and the cable 25 drives the tensioning wheel 23 to rotate along a direction 110. In this process, a protrusion 23*a* on the tensioning wheel 23 mates with the swinging ice breaking arm 41, so that the tensioning wheel 23 drives the swinging ice breaking arm 42 to rotate along a direction 120, and thereby drives the shaft VIII 44 and the ice breaking pull rod 43 to rotate together.

An end of the ice breaking pull rod 43 is provided with a hook 43*a*, and the hook 43*a* hooks a protrusion 15*a* on the engagement plate driving rod 15 without external constraints. As the swinging ice breaking arm 42 rotates along the direction 120, the hook 43*a* drags the protrusion 15*a* on the engagement plate driving rod 15 and forms a motion along a direction 130. As a result, the engagement plate driving rod 15 and the engagement plate 11 rotate together along the direction 140, thereby driving the lock ring 09 to move in the direction 190.

Since the lock ring 09 is usually mounted to a vehicle body or another side of a vehicle door opposite to a door lock, the motion will force the vehicle body and the vehicle door to separate from each other. With a sufficient driving force, the independent process can break the ice and additional impedance between the vehicle body and the vehicle door, so that the door is opened or at least partially opened, which remove obstacles for next manual door opening or door opening through electric hinges. The process is an ice breaking process.

In a preferred implementation, a tilt angle 135 is designed on a contact surface between the hook 43*a* of the ice breaking pull rod 43 and the protrusion 15*a* on the engagement plate driving rod 15. The tilt angle 135 is defined as an included angle between a direction of a contact force F131 between the hook 43*a* and the protrusion 15*a* and a direction of motion of the ice breaking pull rod 43. A typical value of the tilt angle 135 is not less than 3 degrees. The contact force F131 may be split into a component I F132 and a component II F133. The component I F132 extends along the direction of motion of the ice breaking pull rod 43, and the component II F133 ensures that the hook 43*a* is not disengaged from the protrusion 15*a* in the ice breaking process.

Figure 4:
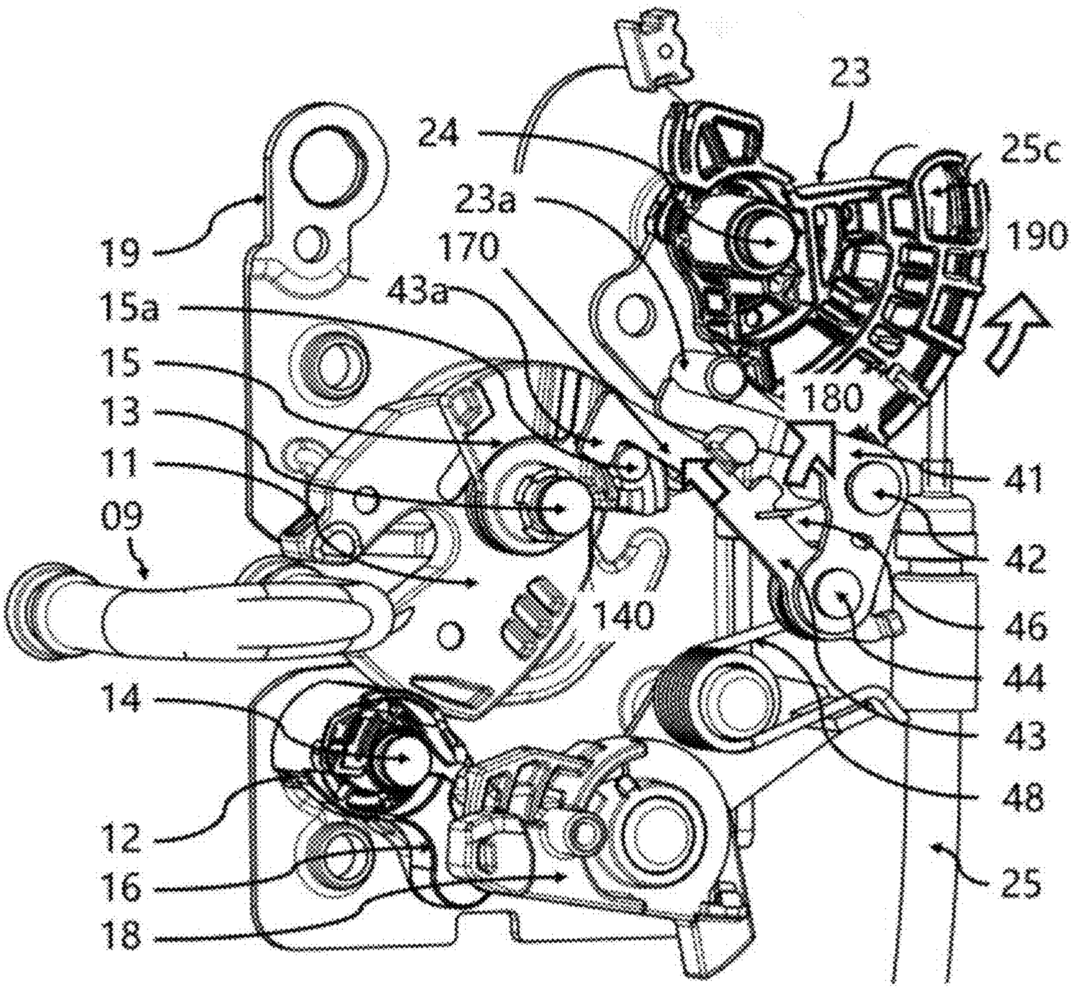
FIG. 4 is a schematic diagram of a lock mechanism with an ice breaking mechanism according to an embodiment of the present disclosure.
Figure 5:
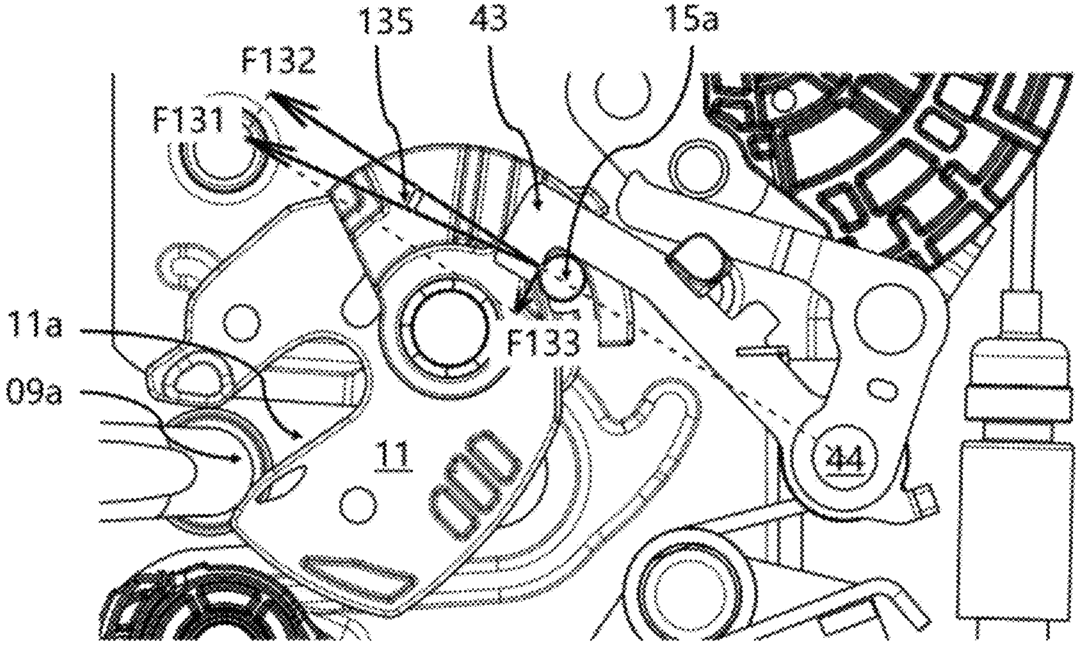
FIG. 5 is a schematic diagram of a lock mechanism with an ice breaking mechanism according to an embodiment of the present disclosure.
Figure 6:
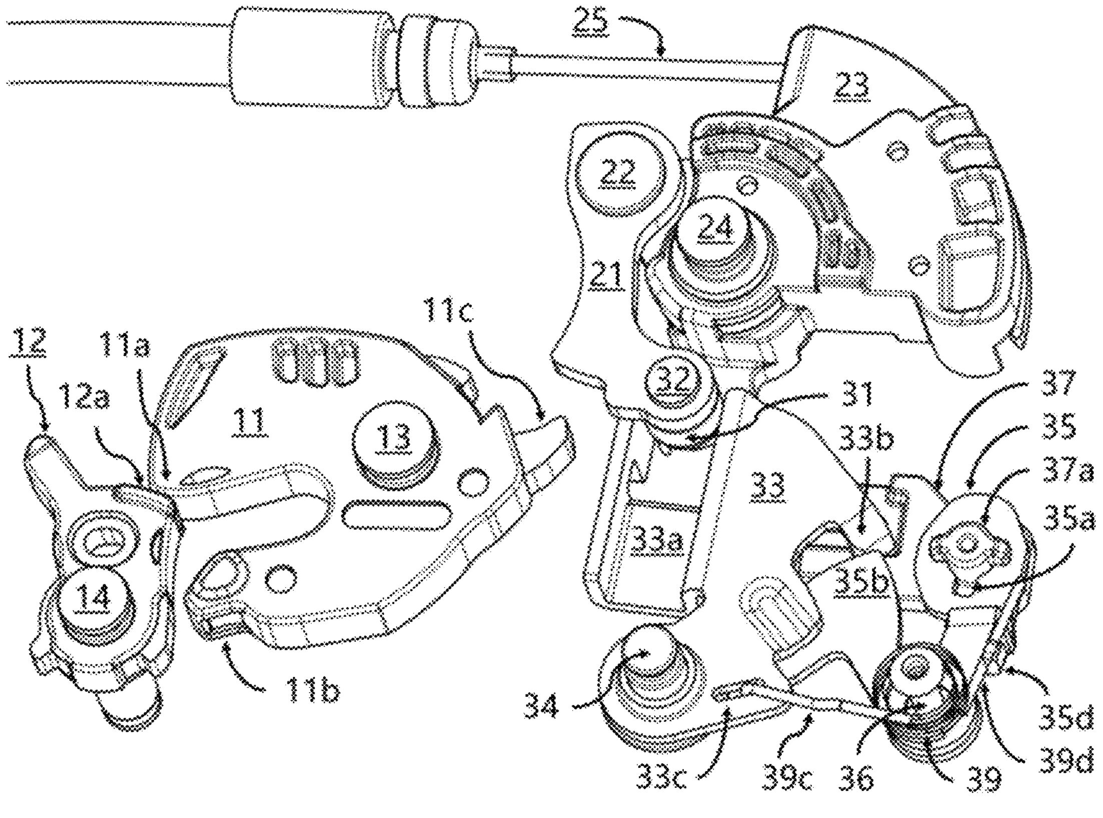
FIG. 6 is a schematic diagram of a lock mechanism with an ice breaking mechanism according to an embodiment of the present disclosure.

In a preferred implementation, a reset spring 48 is further arranged on the lock mechanism. The reset spring 48 may be a torsion spring, a tension spring, or the like. One spring leg of the reset spring 48 is mounted to the shaft VIII 44, and another spring leg is mounted to the support 19 or a housing. A tensile force of the reset spring 48 creates two effects: driving the swinging ice breaking arm 41 to tend to rotate along a direction 180, and driving the ice breaking pull rod 43 to tend to rotate along a direction 170. As shown in FIG. 4, a reset process of the ice breaking mechanism after the vehicle door is opened is as follows. First, the external actuator releases a tension of the cable 25, so that the tensioning wheel 23 rotates along the direction 190, the protrusion 23*a* on the tensioning wheel 23 releases the constraint on the swinging ice breaking arm 41, and the swinging ice breaking arm 41 is driven by the reset spring 48 to rotate and reset along the direction 180. Meanwhile, the ice breaking pull rod 43 resets along the direction 170, and finally returns to a state shown in FIG. 1 to complete the reset.

A spring II 46 is arranged on the shaft VIII 44, two legs of the spring II 46 are respectively connected to the swinging ice breaking arm 41 and the ice breaking pull rod 43, and a tensioning torque of the spring II 46 drives the ice breaking pull rod 43 to tend to rotate away from the shaft VII 42 along a direction 160 relative to the swinging ice breaking arm 41. As a result, the reliable connection between the hook 43*a* and the protrusion 15*a* is ensured, and the free swing of the ice breaking pull rod 43 along the shaft VIII 44 is prevented, thereby avoiding vibration and noise.

In a preferred implementation, the cable 25 and the tensioning wheel 23 not only can realize the ice breaking process, but also can realize a self-suck process, thereby improving the integration and reducing the costs. Specifically, a shaft III 22 is fixed to the tensioning wheel 23, and a swinging claw 21 rotatable about the shaft III 22 is mounted to the shaft III. The shaft V 32 is fixed to the swinging claw 21, and a pulley 31 rotatable about the shaft V 32 is mounted to the shaft V. A shaft VI 34 is fixed to the support 19 or the housing, and a rotatable limiting member 33 is mounted to the shaft VI 34. A limiting groove 33*a* is arranged on the limiting member 33, and a motion of the pulley 31 is limited in the limiting groove 33*a*. As a result, a position of the limiting groove 33*a* defines a motion trajectory of the pulley 31 and further limits the motion of the swinging claw 21. A rotatable supporting arm 35 is mounted to the fixed shaft 36. An end portion 39*c* of a spring I 39 is mounted to a spring mounting portion 33*c* of the limiting member 33, and an end portion II 39*d* of the spring I 39 is mounted to a spring mounting portion 35*d* of the supporting arm 35. Due to a mounting tension moment of the spring I 39, the supporting arm 35 and the limiting member 33 tend to be driven to rotate. In an initial state, a stop 35*b* on the supporting arm 35 contacts a stop 33*b* on the limiting member 33, so that the limiting member 33 limits the rotation of the supporting arm 35. The cable 25 pulls the tensioning wheel 23, so that the tensioning wheel 23 drives the swinging claw 21 through the shaft III 22, and the swinging claw moves together under the limitation of the limiting groove 33*a*, until the swinging claw 21 contacts a protruding portion 11*c* on the engagement plate 11. Further, the swinging claw 21 pushes the protrusion 11*c*, which drives the engagement plate 11 to rotate, and drives the lock ring 09 to move toward the lock body through the groove 11*a*. Since the lock ring 09 is usually mounted to the vehicle body or the other side of the vehicle door opposite to the door lock, the motion forces the vehicle body to approach the vehicle door and enter a locking position. This is a self-suck process. In particular, in the above process, the supporting arm 35 is stationary, and the stop 35*b* of the supporting arm 35 limits the stop 33*b* of the limiting member 33, to keep the limiting member 33 and the limiting groove 33*a* thereon stationary. As a result, the pulley 31 is limited by the stationary limiting groove 33*a*, to ensure further progress of the self-suck process.

A release lever 18 is axially connected to the support 19, or to a housing structure fixed to the support 19.

In particular, a pull rod 37 is further arranged on the lock mechanism. An end portion I 37*a* of the pull rod 37 is connected to the supporting arm 35, and an end portion II 37*c* of the pull rod 37 is connected to a connection 18*c* of the release lever 18. An inclined surface 37*b* is arranged on the pull rod 37, a bulge 43*b* is arranged on the ice breaking pull rod 43, and the inclined surface 37*b* mates with the bulge 43*b*. That is to say, the torque of the spring II 46 drives the ice breaking pull rod 43 to tend to move along the direction of 160, so that the bulge 43*b* can stop on the inclined surface 37*b*.

Figure 7:
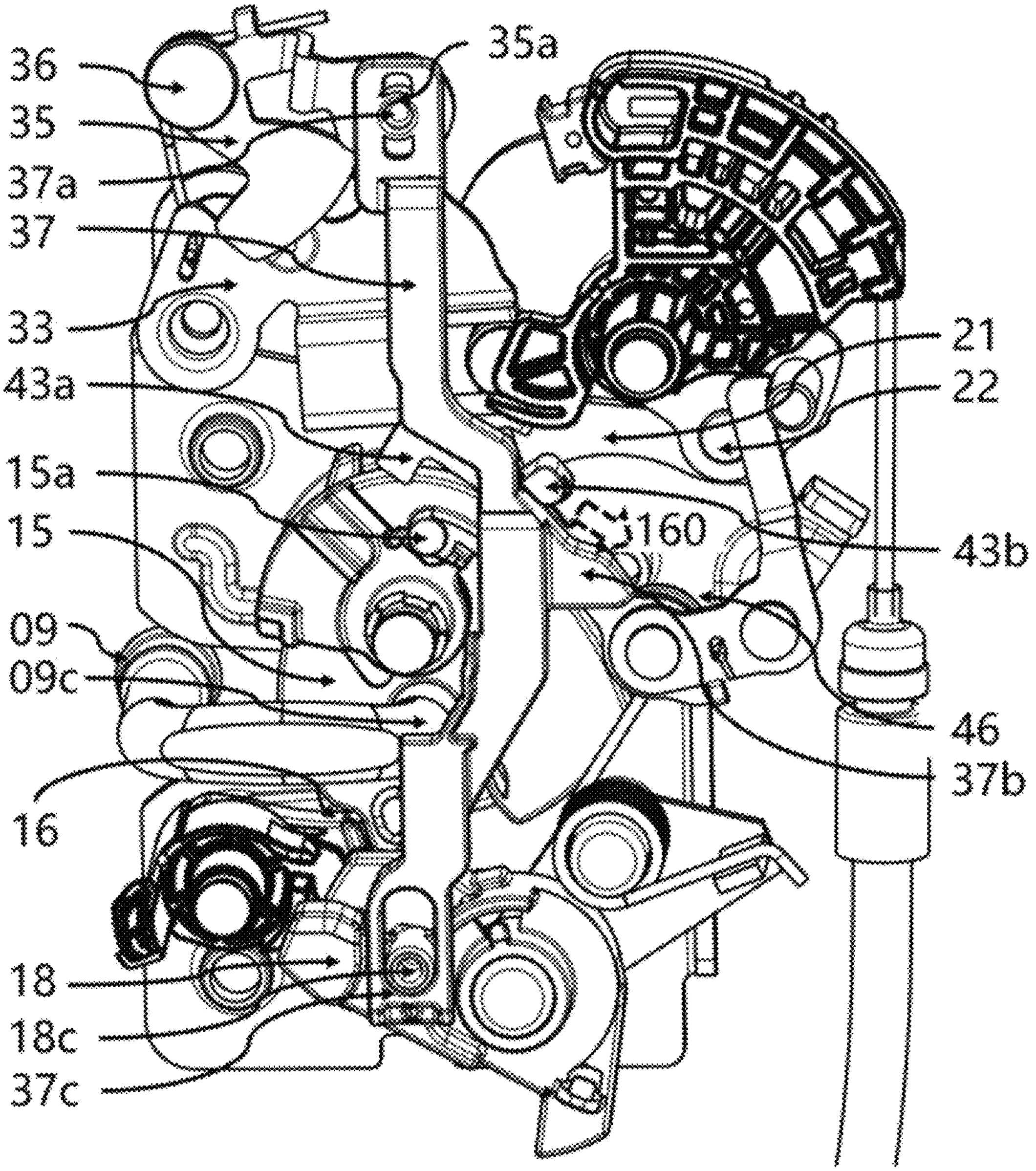
FIG. 7 is a schematic diagram of a lock mechanism with an ice breaking mechanism according to an embodiment of the present disclosure.
Figure 8:
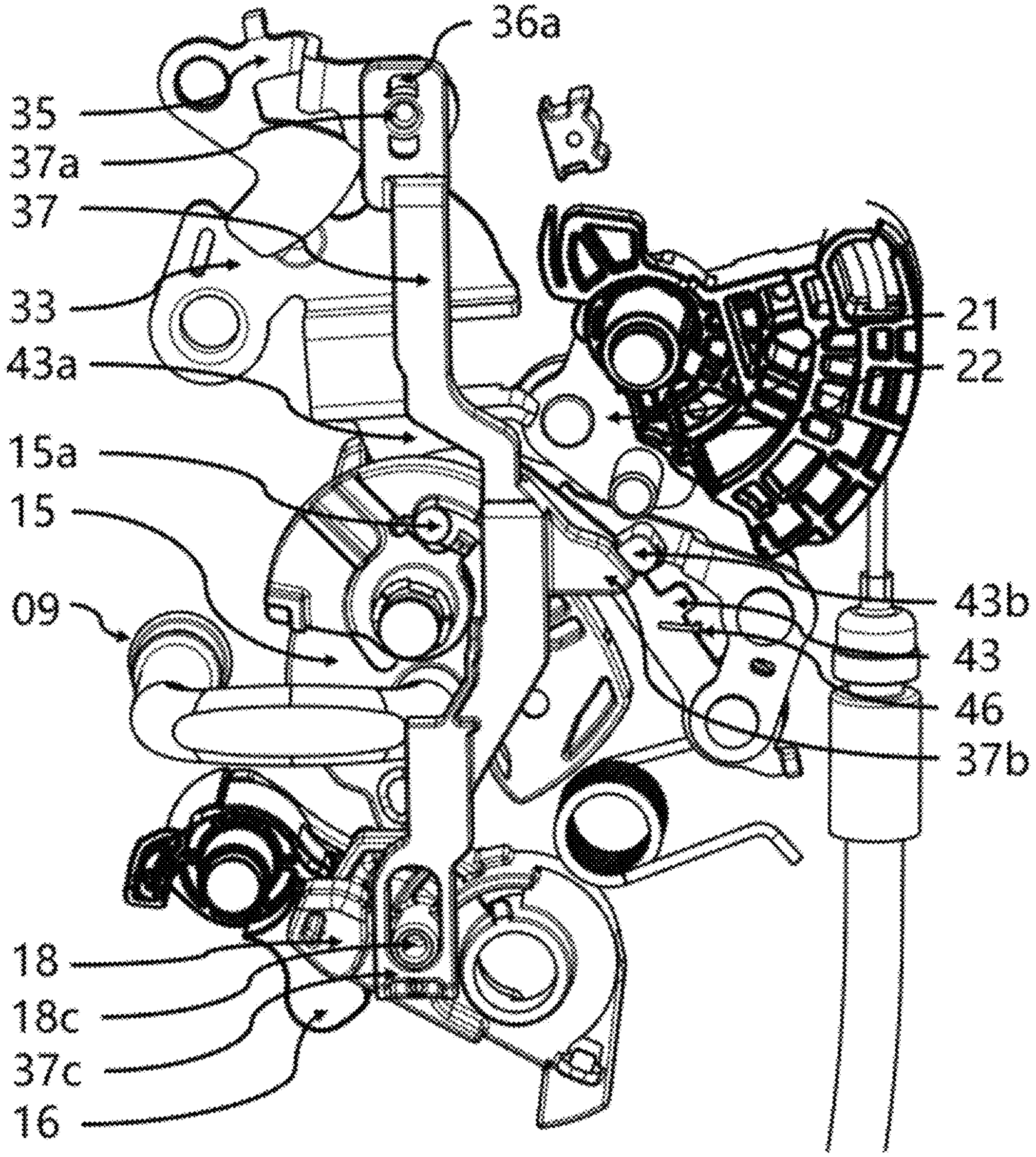
FIG. 8 is a schematic diagram of a lock mechanism with an ice breaking mechanism according to an embodiment of the present disclosure.

When the release lever 18 is in the stopped position shown in FIG. 7, that is, the pawl release lever 16 is not toggled, a self-sucked ready state is presented. In the state, the supporting arm 35 is in the position shown in the figure, and supports the limiting member 33 and drives the engagement plate 15 to move, and the pull rod 37 is limited in the position shown in FIG. 7 by the supporting arm 35. Since the inclined surface 37*b* limits the bulge 43*b*, and further limits the position of the ice breaking pull rod 43, During the motion, the bulge 43*b* slides on the stationary inclined surface 37*b*, so that the hook 43*a* never contacts the protrusion 15*a*. As a result, the ice breaking mechanism is isolated, which ensures the progress of the self-suck process.

Figure 9:
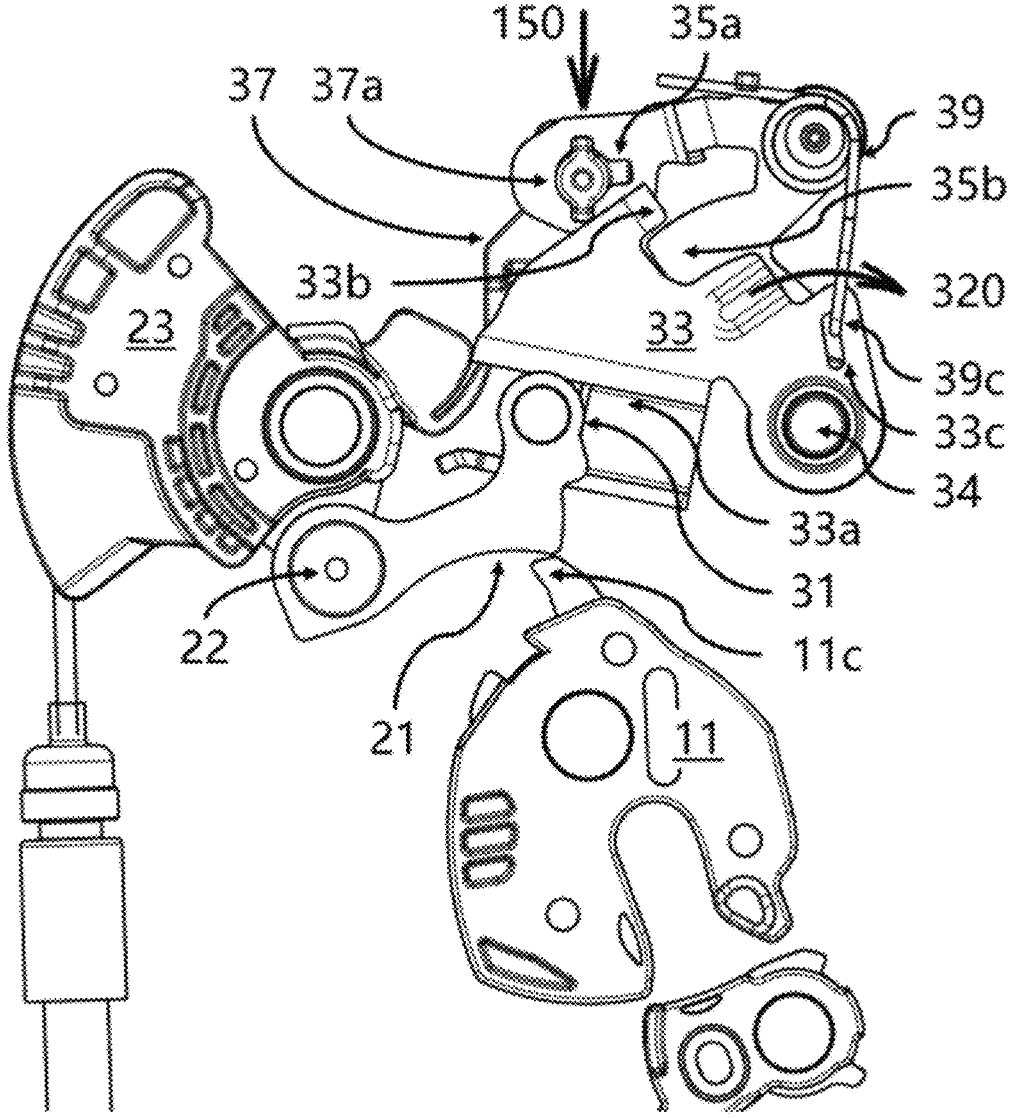
FIG. 9 is a schematic diagram of a lock mechanism with an ice breaking mechanism according to an embodiment of the present disclosure.
Figure 10:
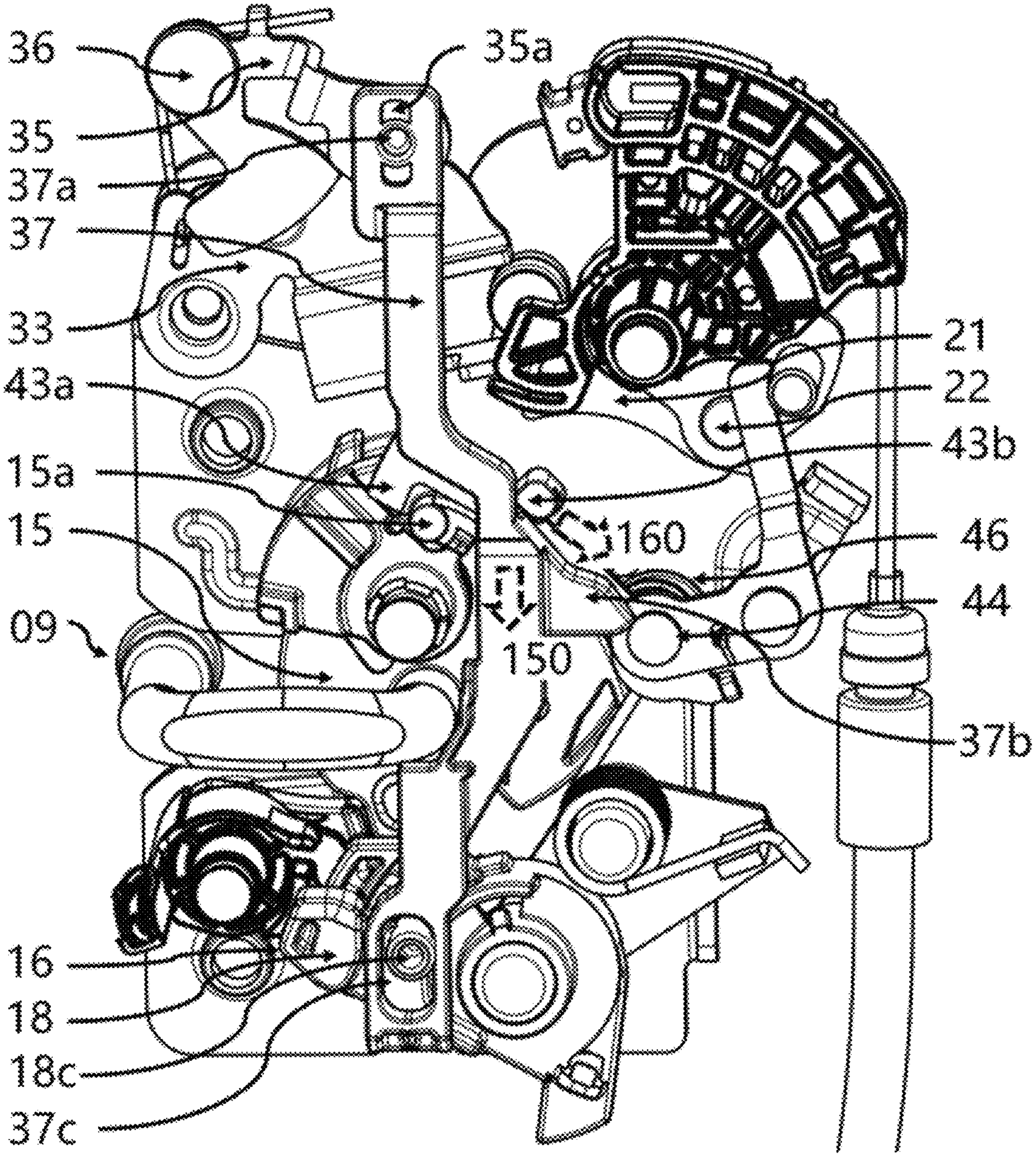
FIG. 10 is a schematic diagram of a lock mechanism with an ice breaking mechanism according to an embodiment of the present disclosure.

When the release lever 18 is in the position shown in FIG. 9, that is, the pawl release lever 16 is toggled, an ice-breaking ready state is presented. In the state, the pull rod 37 is pulled by the release lever 18 and moves in a direction 150. As a result, on the one hand, the supporting arm 35 is pulled to rotate, to release the support for the limiting member 33, so that the limiting member 33 rotates, and the limiting groove 33*a* on the limiting member drives the pulley 31 and the swinging claw 21 to move away from the engagement plate 11. When the swinging claw 21 is disengaged from the protruding portion 11*c* of the engagement plate 11, a transmission chain is disconnected, and a self-suck mechanism is isolated. On the other hand, the inclined surface 37*b* moves away with the pull rod 37 along the direction 150 and is finally disengaged from the bulge 43*b*. The torque of the spring II 46 drives the ice breaking pull rod 43 to rotate about the shaft VIII 44, so that the hook 43*a* can enter and mate with the bulge 15*a*, as shown by the position shown in FIG. 1. As a common result of the above processes, the self-suck mechanism is isolated, and the ice breaking mechanism realizes meshing, which is referred to as the ice-breaking ready state. In the state, if the external actuator drives the cable 25, the ice breaking function can be realized.

The foregoing descriptions are merely preferred embodiments of the present disclosure and are not intended to limit the present disclosure. Any form of equivalent replacements or modifications to the technical solutions and technical content disclosed in the present disclosure made by a person skilled in the art without departing from the scope of the technical solutions of the present disclosure still fall within the content of the technical solutions of the present disclosure and the protection scope of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lock mechanism with an ice breaking mechanism, comprising a lock ring and a lock body, wherein the lock body comprises a support, a shaft I is arranged on the support, an engagement plate and an engagement plate driving rod are mounted to the shaft I, the engagement plate driving rod is configured to drive the engagement plate to rotate together about the shaft I, and a groove configured to mate with the lock ring is arranged on the engagement plate;

a shaft VII is arranged on the support, a swinging ice breaking arm rotatable about the shaft VII is mounted to the shaft VII, a shaft VIII is fixed to the swinging ice breaking arm, an ice breaking pull rod is mounted to the shaft VIII, the ice breaking pull rod is rotatable about the shaft VIII relative to the swinging ice breaking arm, and an end of the ice breaking pull rod is configured to hook the engagement plate driving rod; and a shaft IV is arranged on the support, a tensioning wheel rotatable about the shaft IV is mounted to the shaft IV, and the tensioning wheel mates with the swinging ice breaking arm.

2. The lock mechanism according to claim 1, wherein a shaft II is arranged on the support, a pawl and a pawl release lever rotatable about the shaft II are mounted to the shaft II, and the pawl is fixedly connected to the pawl release lever.

3. The lock mechanism according to claim 1, wherein the tensioning wheel is connected to a cable, and the cable is driven by an external actuator.

4. The lock mechanism according to claim 1, wherein the lock ring has a cylindrical portion, and the groove of the engagement plate mates with the cylindrical portion of the lock ring.

5. The lock mechanism according to claim 1, wherein a spring II is arranged on the shaft VIII, two legs of the spring II are respectively connected to the swinging ice breaking arm and the ice breaking pull rod, and a tensioning torque of the spring II drives the ice breaking pull rod to tend to rotate away from the shaft VII relative to the swinging ice breaking arm.

6. The lock mechanism according to claim 1, wherein a reset spring is further arranged on the support, one spring leg of the reset spring is mounted to the shaft VIII, and another spring leg of the reset spring is mounted to the support or a housing.

7. The lock mechanism according to claim 1, wherein an end of the ice breaking pull rod is provided with a hook, the engagement plate driving rod is provided with a protrusion, and the hook of the ice breaking pull rod hooks the protrusion of the engagement plate driving rod.

8. The lock mechanism according to claim 7, wherein an included angle between a direction of a contact force between the hook of the ice breaking pull rod and the protrusion of the engagement plate driving rod and a direction of motion of the ice breaking pull rod is not less than 3 degrees.

9. The lock mechanism according to claim 1, wherein a shaft III is fixed to the tensioning wheel, a swinging claw rotatable about the shaft III is mounted to the shaft III, a shaft V is fixed to the swinging claw, a pulley freely rotatable about the shaft V is mounted to the shaft V, a shaft VI is mounted to the support or a housing, a rotatable limiting member is mounted to the shaft VI, a limiting groove is arranged on the limiting member, and a motion of the pulley is limited in the limiting groove.

10. The lock mechanism according to claim 9, wherein a protruding portion that mates with the swinging claw is arranged on the engagement plate.

11. The lock mechanism according to claim 9, comprising a fixed shaft, wherein a rotatable supporting arm is mounted to the fixed shaft, and a spring I is mounted between the supporting arm and the limiting member.

12. The lock mechanism according to claim 11, wherein the limiting member stops the supporting arm.

13. The lock mechanism according to claim 11, wherein a release lever is axially connected to the support, and a pull rod is connected between the release lever and the supporting arm.

14. The lock mechanism according to claim 13, wherein an inclined surface is arranged on the pull rod, a bulge is arranged on the ice breaking pull rod, and the inclined surface of the pull rod mates with the bulge of the ice breaking pull rod.

* * * * *